United States Patent
Werner et al.

(10) Patent No.: US 11,079,827 B2
(45) Date of Patent: Aug. 3, 2021

(54) COGNITIVE BATTERY STATE OF CHARGE RECALIBRATION

(71) Applicant: International Business Machines Corporation, Armonk, NY (US)

(72) Inventors: John S. Werner, Fishkill, NY (US);
Noah Singer, New City, NY (US);
John Torok, Poughkeepsie, NY (US);
Arkadiy O. Tsfasman, Wappingers Falls, NY (US); Budy Notohardjono, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/052,683

(22) Filed: Aug. 2, 2018

(65) Prior Publication Data
US 2020/0042069 A1 Feb. 6, 2020

(51) Int. Cl.
*G06F 1/3212* (2019.01)
*H01M 10/44* (2006.01)
*H02J 7/00* (2006.01)

(52) U.S. Cl.
CPC .......... *G06F 1/3212* (2013.01); *H01M 10/44* (2013.01); *H02J 7/0068* (2013.01)

(58) Field of Classification Search
CPC ... G06F 1/3212; G01R 31/382; G01R 31/392; H01M 10/44; H01M 10/0068
USPC .................................... 713/300, 340; 702/63
See application file for complete search history.

(56) References Cited

U.S. PATENT DOCUMENTS

| | | | |
|---|---|---|---|
| 5,808,445 A | 9/1998 | Aylor et al. | |
| 6,232,747 B1 | 5/2001 | Takahashi et al. | |
| 6,356,083 B1 | 3/2002 | Ying | |
| 6,424,123 B1 | 7/2002 | Odaohhara et al. | |
| 6,463,545 B1 * | 10/2002 | Fisher | G06F 1/263 713/300 |
| 6,515,453 B2 | 2/2003 | Feil et al. | |
| 6,630,814 B2 | 10/2003 | Ptasinski et al. | |
| 6,639,385 B2 | 10/2003 | Verbrugge et al. | |
| 7,136,762 B2 | 11/2006 | Ono | |
| 7,492,127 B2 * | 2/2009 | Zelinski | H02J 7/0047 320/132 |
| 7,622,895 B1 * | 11/2009 | Griffin | H02J 7/0047 320/132 |

(Continued)

FOREIGN PATENT DOCUMENTS

WO   2010056488 A1   5/2010

OTHER PUBLICATIONS

Singh et al., "Micro Power Battery State-of-Charge Monitor", IEEE, 2008, 8 Pages.

*Primary Examiner* — Brian T Misiura
(74) *Attorney, Agent, or Firm* — Cantor Colburn LLP; Teddi Maranzano (57) ABSTRACT

Provided are embodiments for performing a cognitive state of charge recalibration, where the embodiments include determining a device usage schedule for a device, and determining a threshold time for performing a recalibration function of a battery of the device. In addition, the embodiments include identifying an available period in the device usage schedule based on the threshold time to perform the recalibration function, and updating device calibration setting based on results of the recalibration function.

11 Claims, 7 Drawing Sheets

(56) References Cited

U.S. PATENT DOCUMENTS

| | | | |
|---|---|---|---|
| 8,175,825 B2* | 5/2012 | Verdun | G01R 35/005 |
| | | | 702/62 |
| 8,427,109 B2 | 4/2013 | Melichar | |
| 8,443,212 B2* | 5/2013 | Landry | G06F 9/4411 |
| | | | 713/300 |
| 8,583,955 B2* | 11/2013 | Lu | H04L 12/66 |
| | | | 713/340 |
| 8,769,327 B2 | 7/2014 | Lu et al. | |
| 8,878,539 B2 | 11/2014 | Melichar | |
| 8,887,872 B2 | 11/2014 | Chen et al. | |
| 9,077,182 B2 | 7/2015 | Wang et al. | |
| 9,634,509 B2* | 4/2017 | Yun | H02J 7/34 |
| 9,664,746 B2* | 5/2017 | Glover | G06F 9/30083 |
| 9,774,203 B2* | 9/2017 | Childress | H02J 7/0021 |
| 9,853,476 B2 | 12/2017 | Lee et al. | |
| 9,912,017 B1 | 3/2018 | Kuo et al. | |
| 10,514,422 B2* | 12/2019 | Zhao | G01R 31/3648 |
| 2010/0289447 A1 | 11/2010 | Dobson et al. | |
| 2011/0193528 A1* | 8/2011 | Huggins | H01M 10/482 |
| | | | 320/134 |
| 2013/0086409 A1* | 4/2013 | Lu | G06F 1/3212 |
| | | | 713/340 |
| 2015/0084778 A1* | 3/2015 | Mittal | G01R 19/16542 |
| | | | 340/636.16 |
| 2016/0261122 A1* | 9/2016 | Childress | H02J 7/0069 |
| 2018/0011145 A1* | 1/2018 | Wu | G01R 31/371 |

* cited by examiner

COGNITIVE BATTERY STATE OF CHARGE RECALIBRATION

BACKGROUND

The present invention generally relates to system and device management, and more specifically, to performing a cognitive state of charge recalibration.

Many devices today include rechargeable batteries as the power source for the device. These devices include mobile phones, laptops, wearable technology, etc. These rechargeable devices provide the user with the convenience and ability to easily move about for a period of time without being tethered to a power supply such as an AC source from a wall outlet. These devices are configured to monitor the battery indicating the remaining capacity until a recharge is required. However, as the devices and batteries age over time, an error in the battery charge level readings can be introduced. There may be a need to perform a calibration to determine the state of the battery to provide a reliable indication of battery life for the users.

SUMMARY

Embodiments of the present invention are directed to a computer-implemented method for performing a cognitive battery state of charge recalibration. A non-limiting example of the computer-implemented method includes determining a device usage schedule for a device, and determining a threshold time for performing a recalibration function of a battery of the device. The computer-implemented method also includes identifying an available period in the device usage schedule based on the threshold time to perform the recalibration function, and updating device calibration setting based on results of the recalibration function.

Embodiments of the present invention are directed to a system for performing a cognitive battery state of charge recalibration. A non-limiting example of the system includes a storage medium, the storage medium being coupled to a processor, wherein the processor is configured to determine a device usage schedule for a device, wherein determining the device usage schedule is based at least in part on contextual data for the device, wherein the contextual data includes at least one of temperature data, alternate power source connectivity, network connectivity, and data plan limits. In addition, the processor is further configured to determine a threshold time for performing a recalibration function of a battery of the device, identify an available period in the device usage schedule based on the threshold time to perform the recalibration function, and update device calibration setting based on results of the recalibration function.

Embodiments of the invention are directed to a computer program product for performing a cognitive battery state of charge recalibration, the computer program product comprising a computer-readable storage medium having program instructions embodied therewith. The program instructions are executable by a processor to cause the processor to perform a method. A non-limiting example of the method includes determining a device usage schedule for a device and determining a threshold time for performing a recalibration function of a battery of the device. The method also includes identifying an available period in the device usage schedule based on the threshold time to perform the recalibration function, and updating device calibration settings based on results of the recalibration function Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, battery-powered devices offer increased flexibility to users as their devices are in use. These devices generally include rechargeable batteries that have a limited capacity. In some configurations, the devices can alert the user of the low charge level and provide instructions to charge the device soon. In other configurations, the devices can reduce the functionality to extend the life of the battery after reaching a threshold level of charge such as reducing the display brightness or turning off various radios of the mobile device. Although the battery life can be extended, if the charge level is not correctly calibrated the device may reduce the functionality of the device too soon or the device battery can be completely drained of a charge before providing an indication to the user. Many devices are configured to provide a graphical representation and/or a numerical indication of the remaining battery life. However, the devices are limited and can only report the data received from the software monitoring the battery's capacity.

For a device that contains a rechargeable battery to learn a batteries capacity, the device must be allowed to deplete its battery power to an optimal minimal level (e.g., 0%, 5%, 10%, etc.), and then completely charge the battery to the optimal maximum level (e.g., 60%, 80%, 100%, etc.). Oftentimes users charge their devices before completely discharging the battery or the devices may be unplugged prior to being completely charged which can lead to the devices reporting inaccurate battery charge levels. In addition, the batteries and devices have a tendency to degrade over time which also leads to inaccurate readings. Users may experience inconveniences by relying on inaccurate charge levels. The techniques described herein provide a method to efficiently discharge and charge the user device during a determined period of time the user is not actively engaged with their device.

Turning now to an overview of the aspects of the invention, one or more embodiments of the invention address the above-described shortcomings of the prior art by providing one or more techniques to efficiently calibrate a battery module that monitors a battery charge level. The process occurs during a period where the user is expected to not be using their device. During the discharge cycle, the device is configured to completely discharge the battery as fast as possible by activating the applications and functions of the device to maximize the power consumed. Subsequently, during the charging phase, the device is configured to be charged as fast as possible by disabling applications and functions of the device to minimize the battery usage. By periodically performing this process, the user device will be able to more accurately report battery capacity without the user making any changes in their typical device behavior. The above-described aspects of the invention address the shortcomings of the prior art by fully discharging and charging the battery to recalibrate the device's reported battery capacity without interfering with the user's normal routine.

Figure 1:
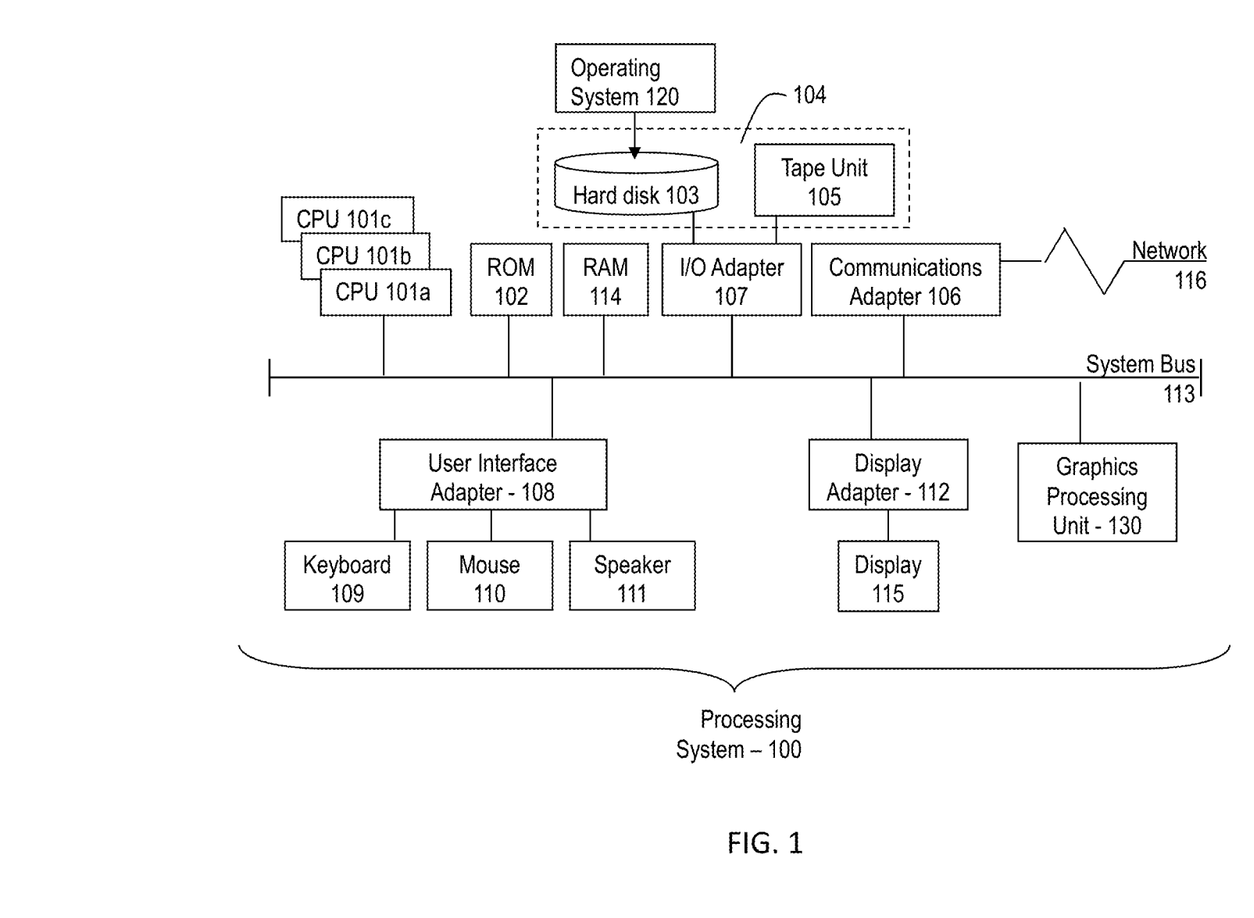
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
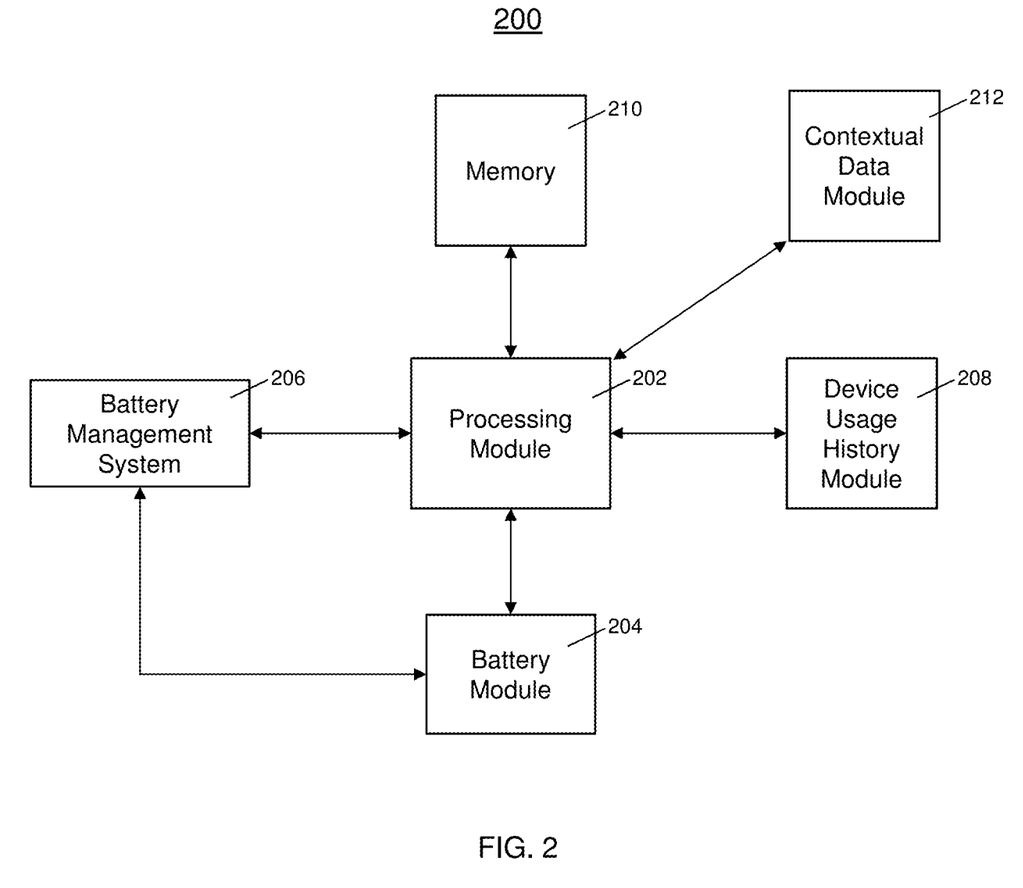
FIG. 2 depicts a system for performing a cognitive state of charge recalibration in accordance with one or more embodiments.

Turning now to a more detailed description of aspects of the present invention, FIG. 2 depicts a system 200 for performing a cognitive state of charge recalibration in accordance with one or more embodiments. It should be understood that the system 200 can include one or more components shown in FIG. 1. In one or more embodiments of the invention, the user devices can include but are not limited to mobile devices such as laptops, mobile phones, tablets, etc. In other embodiments of the invention, the devices can include servers having multiple battery packs that are used for back-up power during switch-over processes or failures.

The system 200 includes a processing module 202 that is configured to receive data received from various sources to implement the recalibration method described below. The processing module 202 includes a battery module 204 where the battery module 204 can include a single battery or a plurality of battery packs. In the event the system 200 includes a plurality of battery packs in the battery module 204, the battery module 204 can be coupled to a battery management system 206. The battery management system 206 is also configured to communicate with the processing module 202. In one or more embodiments of the invention, the processing module 202 is configured to communicate with a device usage history module 208 which is configured to store data such as that shown in reference with FIG. 6 including applications and features and the power consumed by each application and feature.

The contextual data module 212 is coupled to the processing module 202 and can provide data from sources external to the user device such as movement or heart rate data from a wearable technology device, weather data from a third party such as a website, calendar data retrieved from an associated user profile, etc. The system 200 also includes a memory 210 which is configured to store other types of data and communicate with processing module 202.

Figure 3:
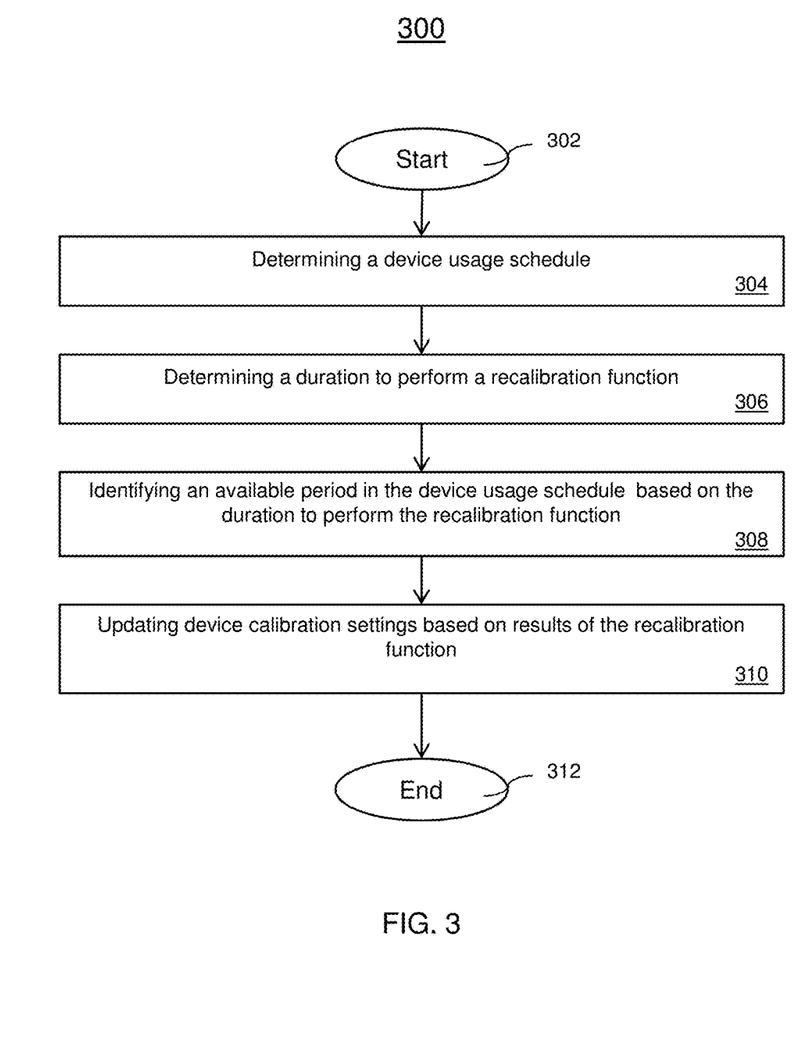
FIG. 3 depicts a flowchart of a method for performing a cognitive state of charge recalibration in accordance with one or more embodiments.

Now referring to FIG. 3, a flowchart of method 300 for performing a cognitive state of charge recalibration in accordance with one or more embodiments is shown. The method 300 begins at block 302 and proceeds to block 304 which provides for determining a device usage schedule. In one or more embodiments of the invention, a typical usage pattern of a user or periods of time when a user is actively engaged with the device is obtained. The periods of inactivity can include periods when users take long breaks from using their device such as when the user is sleeping, working, etc. In one or more embodiments of the invention, an initial device characterization can be executed prior to performing the recalibration function of method 300. The initial device characterization can include obtaining specific attributes of the device (e.g., type, model, S/N, etc.). The attributes can be input into the system manually through a graphical user interface (GUI) or downloaded (automatically) directly upon initial log-in to obtain the devices charging history and planned future activity.

At block 306, the method 300 includes determining a time threshold to perform a recalibration function. The time threshold is a window of time that has been determined to perform an optimal discharge and optimal charge cycle for the device. In one or more embodiments, the optimal discharge factors the amount of time to completely drain the battery from 100%. In other embodiments, the optimal discharge factors the amount of time to completely drain the battery from the current charge level. The optimal discharge is configured to draw as much power as possible to drain the battery as quickly as possible without impacting the user. An optimal charge is configured to draw as little power as possible from the device such that the battery can be charged as quickly as possible to optimal maximum level.

The method 300, at block 308, provides for identifying an available period in the device usage schedule based on the time threshold to perform the recalibration function. Responsive to determining the time threshold, an available period in the device usage schedule is located to perform the recalibration function without impacting the user. For example, the recalibration function can occur while the user is sleeping or at work. The method 300, at block 310, provides for updating device calibration settings based on results of the recalibration function. The data collected from the battery discharge and charge cycle are used to accurately update the device software that reports the battery capacity to the user. Therefore, the most up-to-date information is provided to the user. The method 300 ends a block 312.

Figure 4:
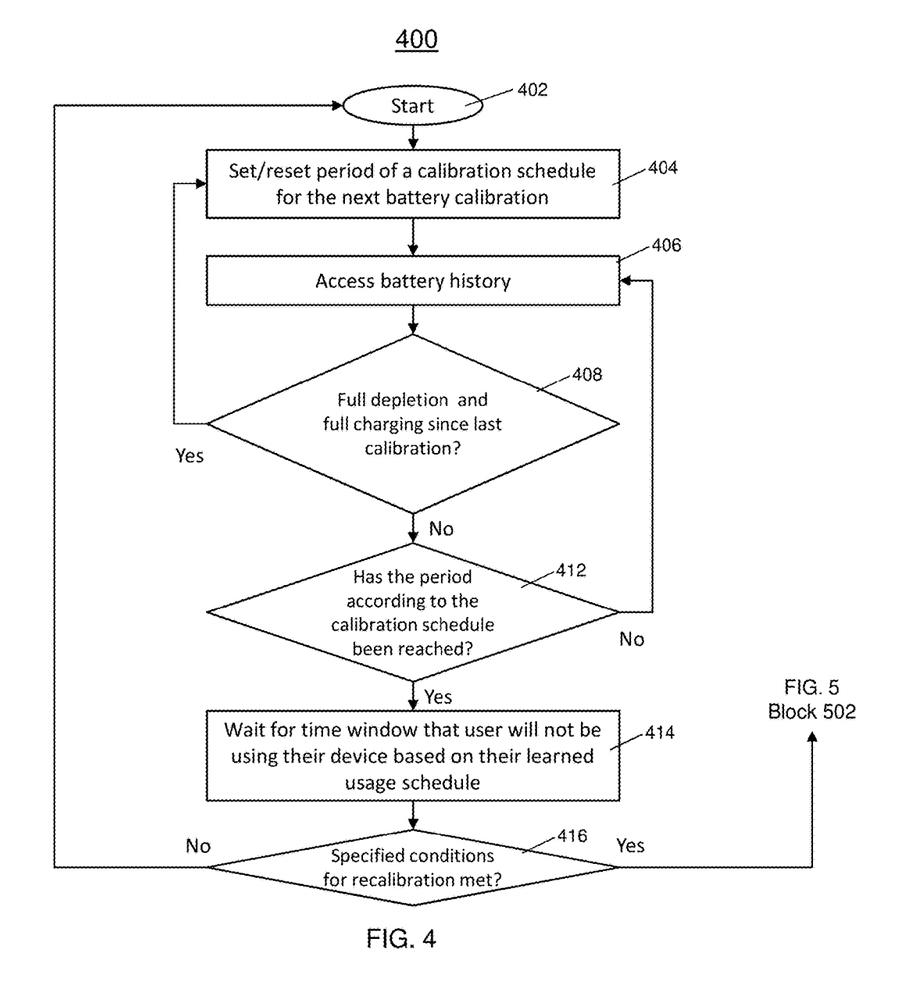
FIG. 4 depicts a flowchart of a method for performing a cognitive state of charge recalibration in accordance with one or more embodiments.

In FIG. 4, a flowchart of a method 400 for performing a cognitive state of charge recalibration in accordance with one or more embodiments is shown. The method 400 provides further details on the process of method 300 and begins at the start block 402. At block 404, the method 400 includes setting/resetting a period of a calibration schedule for the next battery calibration. The battery recalibration function can be performed periodically according to a determined calibration schedule. For example, the battery calibration can be performed once a week, once a month, etc. Different devices can have different periods for performing the calibration. In one or more embodiments of the invention, the threshold may be varied based on the age of the battery; for example, a brand new laptop battery may perform the calibration once a month, whereas a 2-year old battery may perform the calibration weekly. In other embodiments, the period may be variable based on how often the user uses the device. For example, if a first user uses their device nine hours a day and a second user uses the same mode device for four hours, the first user's battery calibration may occur once a week while the second user's battery calibration can occur bi-weekly.

The method 400 at block 406 includes accessing the battery history. The battery history indicates the last time the battery has executed a full discharge and recharge cycle to 100%. At decision block 408, it is determined if the battery has executed a full discharge and full charge cycle since the last calibration (e.g., the user may have depleted the battery and fully charged the device on their own prior to reaching the next scheduled calibration cycle). In one or more embodiments of the invention, the method can reset the next battery calibration to occur one week from the last date. If so (yes branch), the method 400 proceeds to block 404 to set/reset the period of the calibration schedule for the next battery calibration. If not (no branch), the method 400 proceeds to decision block 412 which includes determining if the period for performing the calibration has been reached. If not (no branch), the method 400 returns to block 406 to access the battery history. If so (yes branch), the method 400 continues to block 414 which provides waiting for a window of time the user is not using their device based on the learned scheduled.

Next, the method 400 proceeds to decision block 416 and determines whether the specific conditions for recalibration have been met. For example, these conditions can include the time (i.e., a time based on the user's learned schedule that they will not be using their device), determining the device is plugged in, the device is currently less than a State of Charge (SoC) threshold (e.g., the method may only be performed if the current battery status is below 30% SoC so as to minimize the time to complete a full discharge), the ambient temperature/humidity are within a desired range. If not (no branch), the method 400 proceeds to block 402. If so, the method 400 proceeds to block 502 of FIG. 5 discussed below. For example, if the battery temperature is too low because the user has their device charging in their vehicle during a cold winter night, the recalibration of the battery will not occur because the battery indicator having voltages between 0-100% is different from typical conditions and can lead to inaccurate battery status reporting. In one or more embodiments of the invention, the method can assume that the unmet condition indicates that the user is not following a typical schedule that day and may reset the time to perform the battery calibration at the next available time window, which may be, for example, later that day or the following day.

Figure 5:
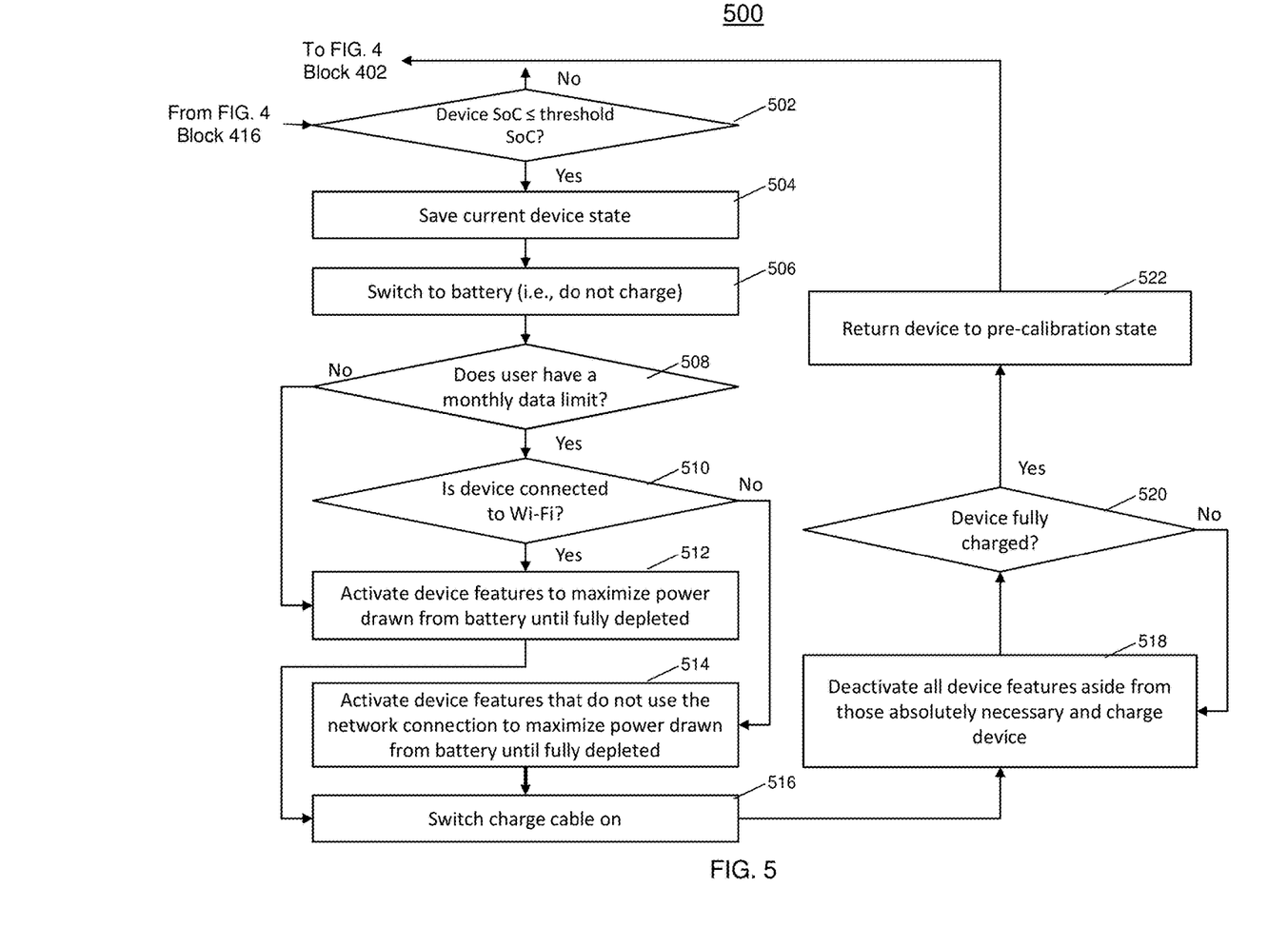
FIG. 5 depicts the power utilization data of a device for performing a cognitive state of charge recalibration in accordance with one or more embodiments.

Now referring to FIG. 5, the method 500 continues from the method 400, block 416. At block 502, the method 500 determines whether the device SoC is less than or equal to a configurable threshold SoC. The SoC threshold can be used to ensure the full discharge and charge cycle occurs within a shorter window of time and that the device is in an expected state. In one or more embodiments of the invention, the threshold may change over time based on the age of the battery. In a different embodiment, if the user plugs in their device prior to a planned calibration cycle, and the user is already above the threshold SoC, the device may not charge the battery if is predicted that the charge state will fall below the threshold SoC by the time window. If the device is plugged in and below the threshold SoC, the current charge level may be maintained until the time window is reached such that the length to discharge the battery is made shorter.

At block 502, if the device SoC is less than the threshold SoC, the method 500 proceeds to block 504 and saves the current state of the device. Saving the current state of the device includes saving current open applications and programs, position within the applications and programs, current notification that have yet to be viewed, connected devices (wired or wireless), etc. After saving the state, the method 500 continues to block 506 and switches to the battery power.

Next, the method 500 proceeds to decision block 508 and determines whether the device is associated with a monthly data limit (or limits upload/download speed when certain data limits are reached), and the decision block 510 determines whether the device is connected to a Wi-Fi connection. In an effort to discharge the battery as quickly as possible, the device may launch a plurality of applications and programs which can be selected in the order of the most processing intensive such as video streaming (with the sound disabled so as not to disturb the user). In other embodiments, the device camera can be activated without recording or taking pictures or a separate program may exist on the device that maxes out CPU power. The device's GPU may be exercised such as constantly repainting the screen where all pixels change.

In a different embodiment of the invention, the device can maximize display brightness or activate the device's flashlight. The orientation of the device may be checked using an accelerometer or gyroscope if the user is expected to be asleep at the time of the recalibration such that only downward pointing brightness is activated. If the user puts their device face up, the flashlight on the back of the device may be active, but if the user puts their device face down, the display may be turned up to the maximum brightness. In other embodiments, the Bluetooth, Wi-Fi, and/or cell antennas may all be activated to search for signals, even if other connections are already established. The device can also activate its GPS to drain the battery as quickly as possible. If it is determined at block 510 the device is not connected to Wi-Fi, the method 500 proceeds to block 514 which includes activating features that do not use the network connection to maximize power drawn from the battery until fully depleted.

Otherwise, the method 500 proceeds to block 512 which provides for activating device features to maximize power drawn from the battery until it is fully depleted (which may include services and applications that utilize a network connection). Next, the method proceeds to block 516 which provides for switching the power from the battery to the AC power source through the charging cable and/or adapter. In one or more embodiments of the invention, a wireless charging adapter can be used in place of a charging cable. The method 500 proceeds to block 518 and includes deactivating all non-critical features while charging the device. In one or more embodiments of the invention, a variety of applications and programs can remain off or one or more features such as GPS and Bluetooth can remain disabled or the display can remain off to ensure that the battery utilization during charging is at a minimum. However, critical elements such as the cell antenna can remain active such that incoming calls, messages, and notification can still be received. At decision block 520 it is determined whether the battery is fully charged. If not, the method 500 returns to block 518 and if so, the method 500 proceeds to block 522 where the device is returned to the pre-calibration state. Finally, the method returns to the start block 402 of FIG. 4 to continue to monitor the battery.

Figure 6:
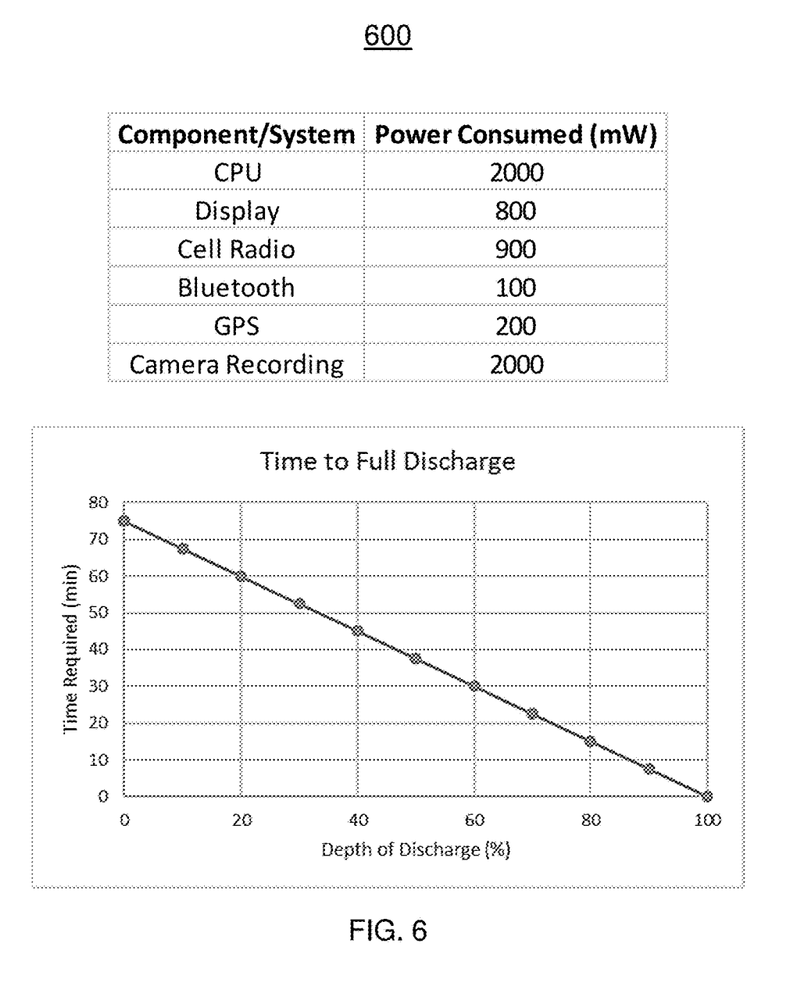
FIG. 6 depicts a chart and graph of time for performing a full discharge of an example device in accordance with one or more embodiments.

In FIG. 6, a non-limiting example of a table and graph 600, associated with the power consumed for each component/system of the device, is shown. The table shown in FIG. 6 represents the typical mobile device having a battery rating of 2500 mAh at 3 V (7500 mWh). If the power for all of the components is maximized, the device will consume 6000 mW. In this example, the CPU usage is 2000 mW, the display uses 800 mW, the cell radio 900 mW, Bluetooth radio 100 mW, GPS 200 mW, and a recording camera is 2000 mW. In one or more embodiments of the invention, the applications and power utilization information can be used to estimate the amount of time it takes to discharge the device.

It should be understood that new features, applications, and functions can be updated or the data for existing entries can be updated over time based on the current usage. From a battery with a capacity of 7500 mWh at 100% charge (i.e., 0% discharge) the time to depletion would be 7500 mWh/ 6000 mWh=1.25 h (75 minutes) to fully deplete the battery starting from a full 100% charge. If a 30% threshold SoC is used as a starting point, the device could be fully discharged in 22.5 minutes.

Also shown in FIG. 6, a graph illustrating discharge time can be calculated using the current SoC of the battery and the data from the table to determine the amount of time to discharge the battery to 0% or the optimal minimum charge. The x-axis of the graph represents the depth of discharge (%) which is based on a ratio of the current battery level and the total battery level. The y-axis represents the time required (minutes) to fully discharge the battery. It should be understood FIG. 6 is a non-limiting example and other types of batteries, rates of discharge, functions, etc. can be used.

Based on the learned usage schedule, an optimal time can be predicted where it is expected that the device will not be in use for a threshold amount of time. The threshold amount of time must be long enough to optimally drain the battery from its expected charge level when the recalibration function is executed and then charge the battery to an optimally maximum level. If at any point during the method 300, 400, and/or 500 the user unexpectedly attempts to use the device the method can be aborted. In another embodiment of the invention, the mobile device can return to its pre-calibration state or the mobile device can begin/continue charging since it is connected via a charge cable. In a different embodiment, the recalibration is marked as incomplete and will be scheduled to run again in the next available time window. The response to the user intervention can be configured by the user.

The contextual data includes information that can be obtained from a source such as wearable technology, a user's calendar, etc. For example, the wearable technology such as a smartwatch can be used to determine whether the user is active based on data from an accelerometer or whether the user is sleeping using heart rate monitors/sensors. This data can be used to determine a period of inactivity of the user and/or a period of time when the user is separated from their device (e.g., the device is in a locker while the user is at school or work). In other embodiments of the invention, data from a user's calendar can be factored in to determine periods when the user may alter their typical schedule (e.g., the user is going to a sporting event or concert and will likely go to bed at a later than usual time). It is to be understood that other types of contextual data can be considered in determining when the user is active/inactive.

Figure 7:
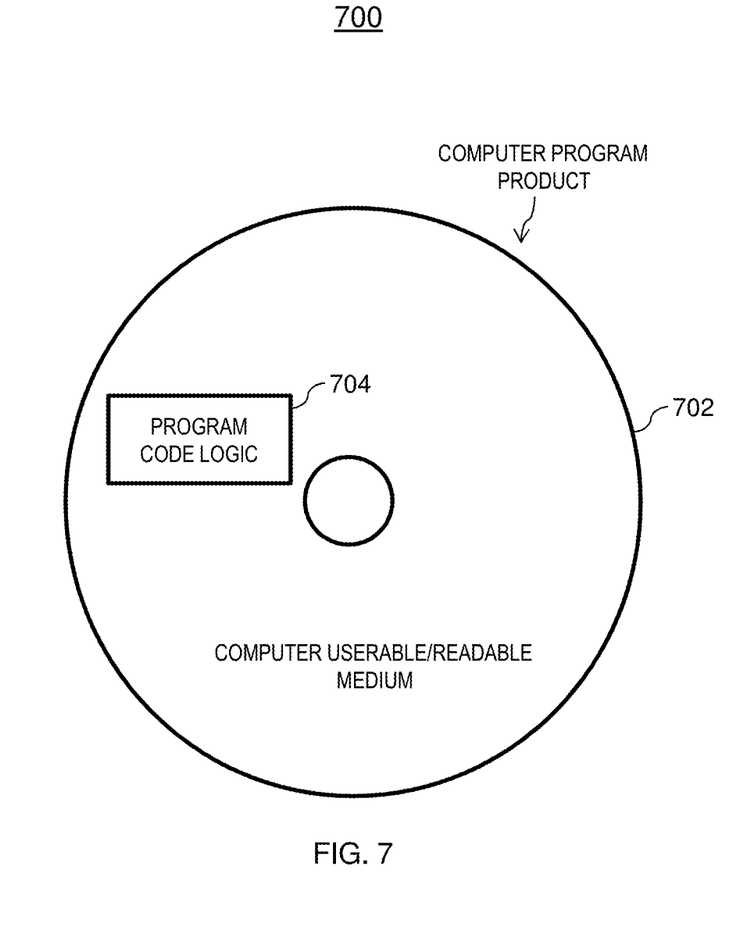
FIG. 7 depicts a computer program product in accordance with one or more embodiments of the invention.

Referring now to FIG. 7, a computer program product 700 in accordance with an embodiment that includes a computer-readable storage medium 702 and program instructions 704 is generally shown.

In an alternate embodiment of the invention, the battery calibration can also be applied to devices such as servers. Servers can be integrated batteries or battery packs to provide power during power outages, switch-overs, or any other event where the main power source is lost. In these systems, a period to determine the recalibration can be determined by monitoring the CPU utilization to determine a pattern of usage or when the systems experience heavier loads. Based on the learned history, an optimal discharge and charge routine can be scheduled when the CPU utilization is expected to be at its lowest point. In one or more embodiments of the invention, each battery of a battery pack can be calibrated sequentially rather than performing the calibration of all of the batteries at the same time. This allows for at least one of the batteries to be available to function as a backup to the system.

The techniques described herein improve over the prior art by leveraging the functionality of the user device to maximize the charging and discharging cycles to calibrate the reported power levels during a learned period of non-use of the device. Instead of applying a generic window of time to perform the calibration function, each schedule is tailored to respective users' behavior. In addition, the techniques include constantly updating the pattern of phone usage by the user to perform a subsequent calibration. The technical effects and benefits include recalibrating the device without interrupting the user's typical routine offering higher reliability battery charge level readings.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing a cognitive state of charge recalibration, the method comprising:
    determining a device usage schedule for a device;
    determining a threshold time for performing a recalibration function of a battery of the device, wherein the recalibration function is performed based at least in part on a state of charge (SoC) threshold, wherein the threshold time is based on optimally discharging and optimally charging the battery, wherein optimally discharging the battery comprises maximizing device functionality to discharge the battery, and wherein optimally charging the battery comprises minimizing battery utilization while charging the battery to a maximum level, wherein the battery is one of a plurality of batteries of a battery pack;
    identifying an available period in the device usage schedule based on the threshold time to perform the recalibration function;
    detecting the device is connected to external power and below the SoC threshold, maintaining a current charge level of the device until the available period is reached;
    performing the recalibration, wherein performing the recalibration comprises sequentially recalibrating each of the plurality of batteries of the battery pack;
    maintaining at least one of the plurality of batteries of the battery pack as a backup during the recalibration; and
    updating device calibration setting based on results of the recalibration function.

2. The computer-implemented method of claim 1, wherein determining the device usage schedule is based at least in part on contextual data for the device, wherein the contextual data includes at least one of temperature data, alternate power source connectivity, network connectivity, and data plan limits.

3. The computer-implemented method of claim 1, wherein the recalibration function is aborted responsive to user intervention of the device.

4. The computer-implemented method of claim 1, further comprising scheduling a subsequent recalibration function based at least in part on the device usage schedule and a completed device recalibration function.

5. The computer-implemented method of claim 1, further comprising saving a state of the device prior to performing the recalibration function; and
    responsive to performing the recalibration function, restoring the state of the device.

6. A system for performing a cognitive state of charge recalibration, the system comprising:
    a storage medium, the storage medium being coupled to a processor;
    the processor configured to:
        determine a device usage schedule for a device, wherein determining the device usage schedule is based at least in part on contextual data for the device, wherein the contextual data includes at least one of temperature data, alternate power source connectivity, network connectivity and data plan limits;
        determine a threshold time for performing a recalibration function of a battery of the device, wherein the recalibration function based at least in part on a state of charge (SoC) threshold, wherein the threshold time is based on optimally discharging and optimally charging the battery, wherein optimally discharging the battery comprises maximizing device functionality to discharge the battery, and wherein optimally charging the battery comprises minimizing battery utilization while charging the battery to a maximum level, wherein the battery is one of a plurality of batteries of a battery pack;
        identify an available period in the device usage schedule based on the threshold time to perform the recalibration function;
        detect the device is connected to external power and below the SoC threshold prior to the available period, maintain a current charge level of the device until the available period is reached;
        perform the recalibration, wherein performing the recalibration comprises sequentially recalibrating each of the plurality of batteries of the battery pack;
        maintain at least one of the plurality of batteries of the battery pack as a backup during the recalibration; and
        update device calibration setting based on results of the recalibration function.

7. The system of claim 6, wherein the processor is further configured to schedule a subsequent recalibration function based at least in part on the device usage schedule and a completed device recalibration function.

8. The system of claim 6, wherein the processor is further configured to save a state of the device prior to performing the recalibration function; and
    responsive to performing the recalibration function, restore the state of the device.

9. A computer program product for performing a cognitive state of charge recalibration, the computer program product comprising a computer-readable storage medium having program instructions embodied therewith, the program instructions executable by a processor to cause the processor to:
    determine a device usage schedule for a device, wherein determining the device usage schedule is based at least in part on contextual data for the device, wherein the contextual data includes at least one of temperature data, alternate power source connectivity, network connectivity and data plan limits;
    determine a threshold time for performing a recalibration function of a battery of the device, wherein performing the recalibration function based at least in part on a state of charge (SoC) threshold, wherein the threshold time is based on optimally discharging and optimally charging the battery, wherein optimally discharging the battery comprises maximizing device functionality to discharge the battery, and wherein optimally charging the battery comprises minimizing battery utilization while charging the battery to a maximum level, wherein the battery is one of a plurality of batteries of a battery pack;
    identify an available period in the device usage schedule based on the threshold time to perform the recalibration function;
    detect the device is connected to external power and below the SoC threshold prior to the available period, maintain a current charge level of the device until the available period is reached;
    perform the recalibration, wherein performing the recalibration comprises sequentially recalibrating each of the plurality of batteries of the battery pack;
    maintain at least one of the plurality of batteries of the battery pack as a backup during the recalibration; and
    update device calibration setting based on results of the recalibration function.

10. The computer program product of claim 9, wherein the processor is further configured to schedule a subsequent recalibration function based at least in part on the device usage schedule and a completed device recalibration function.

11. The computer program product of claim 9, wherein the processor is further configured to save a state of the device prior to performing the recalibration function; and
    responsive to performing the recalibration function, restore the state of the device.

* * * * *